(12) United States Patent
Satoh et al.

(10) Patent No.: US 6,896,309 B2
(45) Date of Patent: May 24, 2005

(54) VEHICLE SEAT STORAGE ASSISTING APPARATUS

(75) Inventors: Shinobu Satoh, Wako (JP); Osamu Kyogoku, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/628,771

(22) Filed: Jul. 28, 2003

(65) Prior Publication Data

US 2004/0046408 A1 Mar. 11, 2004

(30) Foreign Application Priority Data

Aug. 27, 2002 (JP) ........................................ 2002-247406

(51) Int. Cl.[7] .............................................. B60N 2/10
(52) U.S. Cl. ...................... 296/65.09; 297/15; 297/326
(58) Field of Search ........................... 296/65.01, 65.05, 296/65.08, 65.09; 297/15, 325, 326, 332, 333

(56) References Cited

U.S. PATENT DOCUMENTS 5,498,051 A * 3/1996 Sponsler et al. ......... 296/65.03
6,123,380 A * 9/2000 Sturt et al. ............... 296/65.09
6,158,800 A * 12/2000 Tsuge et al. ............. 296/65.09
6,179,363 B1 * 1/2001 Palajac et al. ........... 296/65.03
6,347,834 B1 * 2/2002 Couasnon .................. 297/341
6,568,756 B2 * 5/2003 Sugimoto et al. .......... 297/335

FOREIGN PATENT DOCUMENTS

JP 10-119613 5/1998

* cited by examiner

Primary Examiner—Joseph D. Pape
(74) Attorney, Agent, or Firm—Merchant & Gould P.C.

(57) ABSTRACT

In a vehicle seat storage assisting apparatus, a folded second rear seat can be rotated to a front side and a rear side about seat rotating shaft members provided at both side portions thereof. A rearward and forward biasing springs are provided between the seat rotating shaft members and floor support brackets respectively. The biasing force of the rearward biasing spring gradually decreases as the second rear seat which is being in a horizontal state A forward of the seat rotating shaft members rotates from the horizontal state A to a vertical state B. The biasing force of the forward biasing spring gradually decreases as the second rear seat which is being in a horizontal state C rearward of the seat rotating shafts rotates from the horizontal state C to the vertical state B.

13 Claims, 7 Drawing Sheets

VEHICLE SEAT STORAGE ASSISTING
APPARATUS

BACKGROUND OF THE INVENTION

The present invention relates to a vehicle seat storage assisting apparatus for rotating clockwise and counterclockwise a seat back and a seat cushion in a state that the seat back is folded on the seat cushion, and more particularly to a vehicle seat storage assisting apparatus which can reduce an operation force required to rotate a vehicle seat constituted by the seat back and the seat cushion.

In vehicle seats, as shown in, for example, JP-A-10-119613, there is known a vehicle seat which is provided in a rearmost row and is constructed so as to be rotated forward and backward while a seat back being folded on a seat cushion.

The folded seat is constructed so as to be stored in a seat storing portion formed in a rear floor panel in a horizontal state. Accordingly, when there is much luggage, the seat can be rotated backward in a folded state to be stored in the storing portion in the floor panel, whereas when there are many passengers instead of the much luggage, the seat so stored in the storing portion can be rotated forward to provide additional seating space for the passengers.

In the aforesaid related art, since the seat in the rearmost row can be unfolded to provide seating space and folded to be stored depending on the number of passengers and amount of luggage, the seat is superior in utility. On the other hand, a certain magnitude of force is required to implement the rotating operation, because the weights of both the seat back and the seat cushion have to be taken care of when rotating the seat.

While such a rotating operation of the seat can be attempted to be implemented using a driving apparatus, adding such a driving apparatus to a vehicle leads to a problem that the vehicle weight is increased, which increases, in turn, the fuel consumption of the vehicle, finally leading to an increase in running costs thereof.

SUMMARY OF THE INVENTION

Accordingly, it is an object of the invention to provide a vehicle seat storage assisting apparatus which can deal with the problem at low costs while avoiding an increase in vehicle weight so as to reduce the load borne by the operating person.

The object can be attained by a vehicle seat storage assisting apparatus according to a first aspect of the present invention. In the vehicle seat storage assisting apparatus, a seat back (for example, a seat back 4b in an embodiment) is supported so as to be folded on a seat cushion (for example, a seat cushion 4a in the embodiment) side and such that the seat so folded up (for example, a second rear seat 4 in the embodiment) can be rotated to a front side and a rear side about seat rotating shafts (for example, rotating shaft members 19 in the embodiment) provided at both side portions thereof. In the vehicle seat storage assisting apparatus, a resilient member (for example, backward biasing spring S1, a forward biasing spring S2 in the embodiment) is provided between each of the seat rotating shafts and a floor support bracket (for example, floor brackets 8, 8', 80, 80' in the embodiments) and in that one (for example, the backward biasing spring S1 in the embodiment) of the resilient members is set such that the biasing force thereof gradually decreases as the seat which is being in a horizontal state (for example, a horizontal state A illustrated in FIG. 2 in the embodiment) forward of the seat rotating shafts rotates from the horizontal state to a vertical state (for example, a vertical state B illustrated in FIG. 2 in the embodiment), whereas the other resilient member (for example, the forward biasing spring S2 in the embodiment) is set such that the biasing force thereof gradually decreases as the seat which is being in a horizontal state (for example, a horizontal state C illustrated in FIG. 2 in the embodiment) rearward of the seat rotating shafts rotates from the horizontal state to the vertical state.

According to this construction, in a case where the seat which is folded up in the horizontal state forward of the seat rotating shafts is rotated up to the vertical state, one of the resilient members imparts a biasing force in the rotating direction so as to assist in so rotating the seat, and in a case where the seat in the vertical state is rotated further down to the horizontal state rearward of the seat rotating shafts, the seat rotates from its own weight which exceeds the biasing force of the other resilient member acting in an opposite direction to the rotating direction.

According to a second aspect of the invention, there is provided a vehicle seat storage assisting apparatus wherein the biasing force is set to be smaller than the weight of the seat.

According to this construction, in a case where the seat is rotated to the front side or to the rear side from the vertical state to be put in the horizontal state, the seat can rotate from its own weight while being imparted the biasing force by the resilient member.

According to a third aspect of the invention, there is provided a vehicle seat storage assisting apparatus wherein each of the resilient members is set such that the biasing force thereof gradually decreases as the seat which is being in the horizontal state rotates from the horizontal state to the vertical state and furthermore such that no biasing force is imparted in a range where the seat rotates from the vertical state to the horizontal states which are situated 180 degrees opposite to each other, respectively.

According to this construction, in a case where the seat which has been rotated from the horizontal state to the vertical state is rotated further down to the other horizontal state, no biasing force is imparted from the resilient member which has imparted the biasing force to the seat when it moved to the vertical state.

Furthermore, according to the present invention, the above-mentioned object can be attained by a vehicle seat storage assisting apparatus for a foldable seat including a seat cushion and a seat back folded on the seat cushion side, the apparatus comprising:

first and second seat rotating shafts provided at both sides of the seat cushion in such a manner that the seat can be rotated to a front side and a rear side of a vehicle body about the first and second seat rotating shafts;

a first support bracket mounted relative to a vehicle body; and a first resilient member disposed between the first seat rotating shaft and the first floor support bracket for providing a biasing force that gradually decreases as the seat rotates towards one of the front and rear sides of the vehicle body.

In the above-mentioned apparatus, it is advantageous to further comprising, a second support bracket mounted relative to the vehicle body; and a second resilient member disposed between the second seat rotating shaft and the second floor support bracket for providing a biasing force that gradually decreases as the seat rotates towards the other of the front and rear sides of the vehicle body.

In the above-mentioned vehicle seat storage assisting apparatus, it is preferable that the first resilient member provides the biasing force that gradually decreases as the seat rotates towards the rear side of the vehicle body until the seat becomes approximately vertical; and that the second resilient member provides the biasing force that gradually decreases as the seat rotates toward the front side of the vehicle body until the seat becomes approximately vertical.

In addition, in the above-mentioned vehicle seat storage assisting apparatus, it is also preferable that the biasing force of the first resilient member is set to be smaller than the weight of the seat, and the biasing force of the second resilient member is set to be smaller than the weight of the seat.

In addition, in the above-mentioned vehicle seat storage assisting apparatus, it is further preferable that the biasing force thereof gradually decreases as the seat which is being in a horizontal state rotates from the horizontal state to a vertical state and also such that no biasing force is imparted in a range where the seat rotates from the vertical state to a horizontal state which is situated 180 degrees opposite to the horizontal state.

Moreover, according to the present invention, the above-mentioned object can also be attained by a vehicle seat storage assisting apparatus for a foldable seat including a seat cushion and a seat back that is operable to be folded on the seat cushion side, the apparatus comprising:

a seat rotating shaft provided on or near the rear of the seat cushion in such a manner that the seat can be rotated to a front side and a rear side of a vehicle body about the seat rotating shaft;

a floor support bracket mounted relative to a vehicle body;

a resilient member disposed between the seat rotating shaft and the floor support bracket for providing a biasing force that gradually decreases as the seat in a horizontal state rotates about the seat rotating shaft until the seat becomes approximately vertical.

DETAILED DESCRIPTION OF THE PREFERRED EMBODIMENTS

Preferred embodiments of the present invention will be described below by reference to the accompanying drawings.

Figure 1:
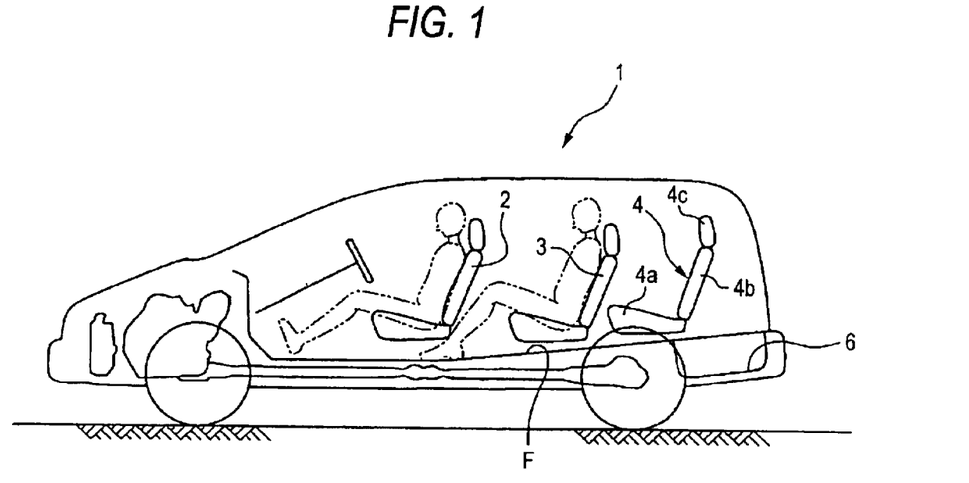
FIG. 1 is a side through view of a vehicle according to an embodiment of the invention.

In FIG. 1, a front seat 2, a first rear seat 3 and a second rear seat 4 are provided in three rows on a floor panel F of a vehicle 1 in a longitudinal direction of the vehicle body from a front side to a rear side of the vehicle. A storing portion 6 is formed in the floor panel F behind the second rear seat 4 in the third row.

Figure 2:
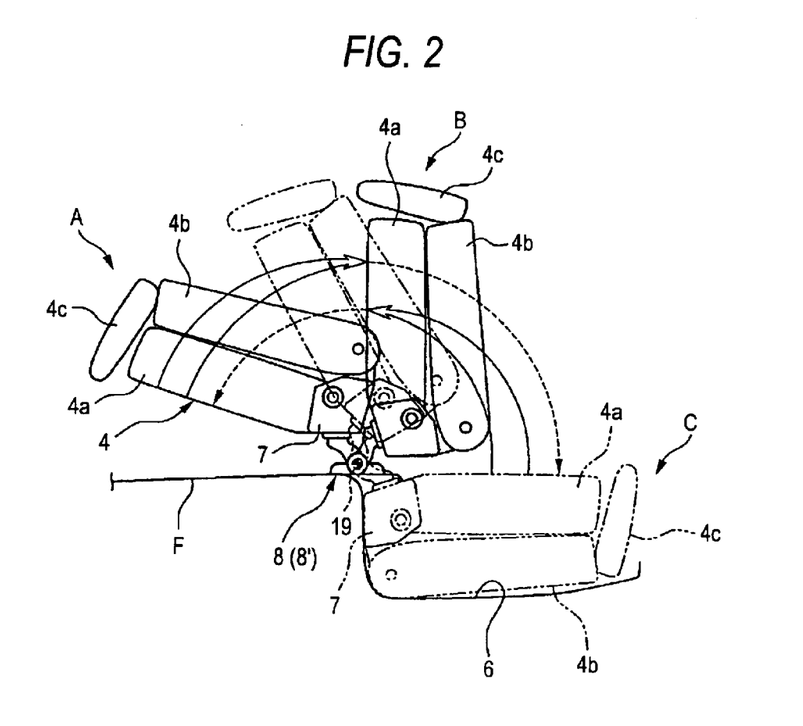
FIG. 2 is a drawing showing rotating states of a second rear seat according to the embodiment of the invention.
Figure 3:
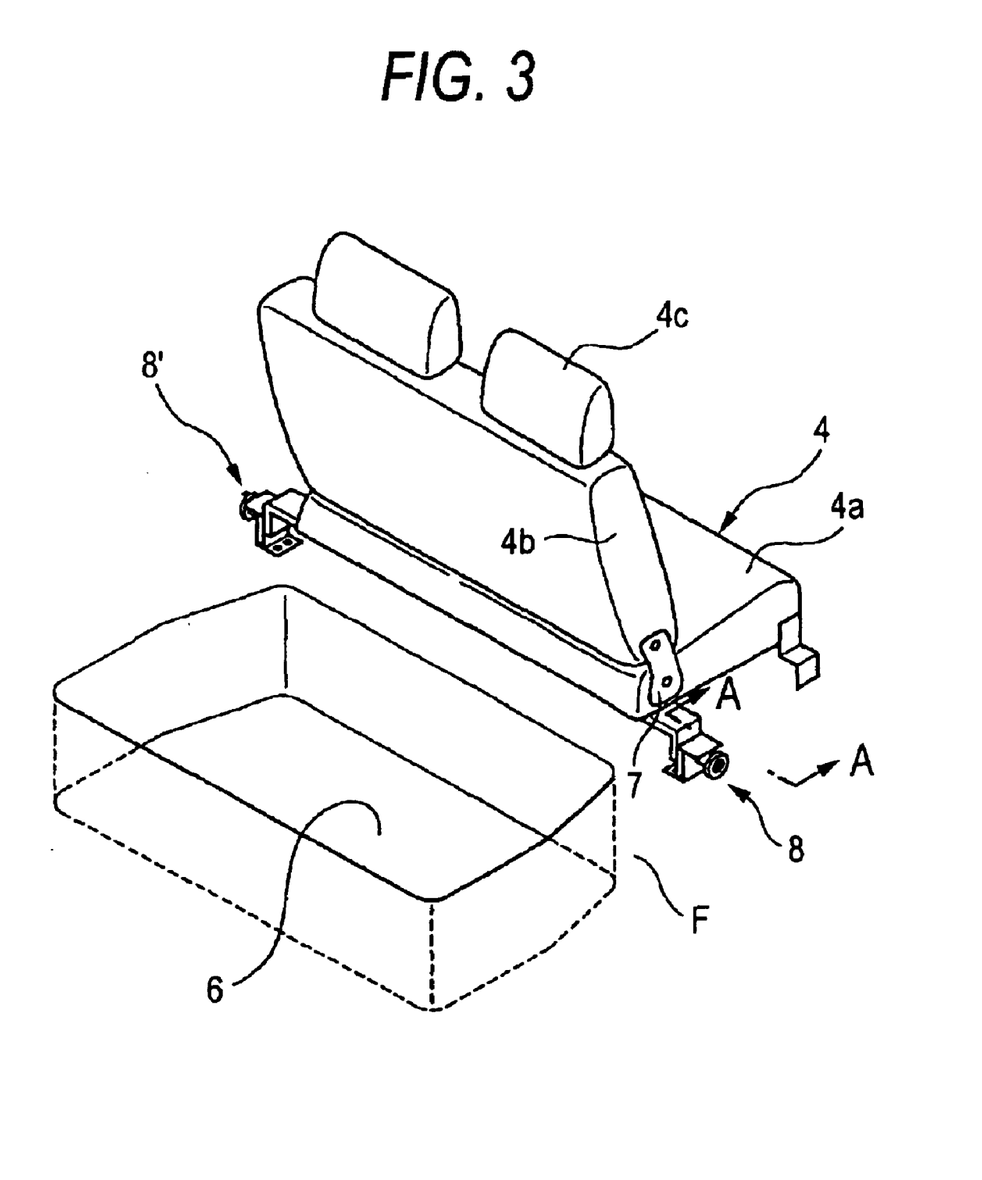
FIG. 3 is a perspective view of the second rear seat according to the embodiment of the invention.

As shown in FIGS. 2, 3, the second rear seat 4 is mainly constituted by a seat cushion 4a and a seat back 4b, and head restraints 4c are provided on the seat back 4b in a foldable fashion. A lower side of the seat back 4b is rotatably supported at a rear side portion of the seat cushion 4a via brackets 7. The brackets 7 allow the second rear seat 4 to be folded up in such a manner that the seat back 4b is folded on the side of the seat cushion 4a.

The seat cushion 4a is supported on the floor panel F at a rear side portion on a back side thereof via floor support brackets 8, 8'. As shown in FIG. 2, the second rear seat 4 with the seat back 4b being folded on the seat cushion 4a side is allowed to be rotated about rotating shaft members (for example, seat rotating shafts) 19 provided on both sides of the seat cushion 4a, which will be described later on, to a forward horizontal state A, a central vertical state B and a rearward horizontal state C. Here, the second seat 4 which is folded into the rearward horizontal state C (at a position which is situated about 180 degrees opposite to the horizontal state A) is stored in the storing portion 6.

Figure 4:
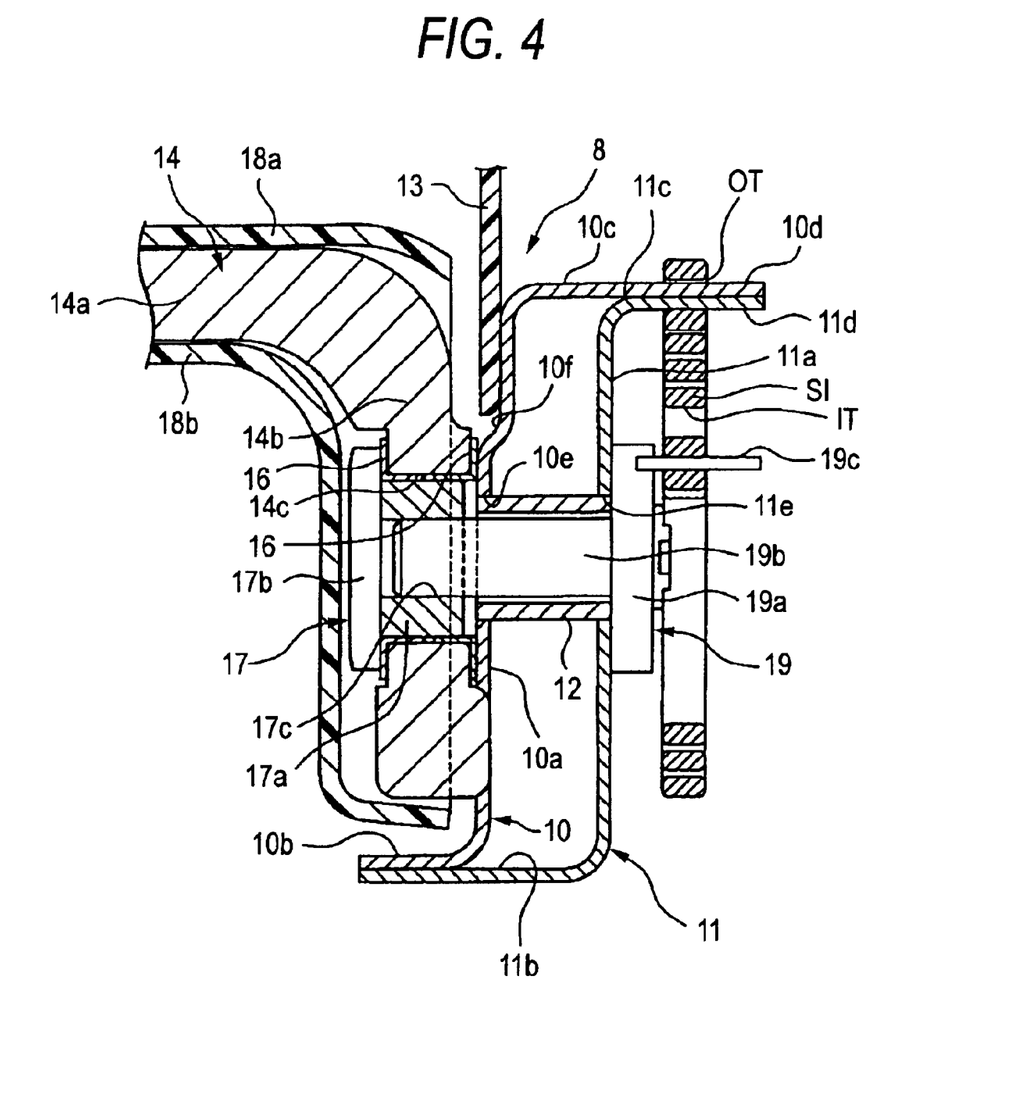
FIG. 4 is a sectional view taken along the line A—A in FIG. 3.
Figure 5:
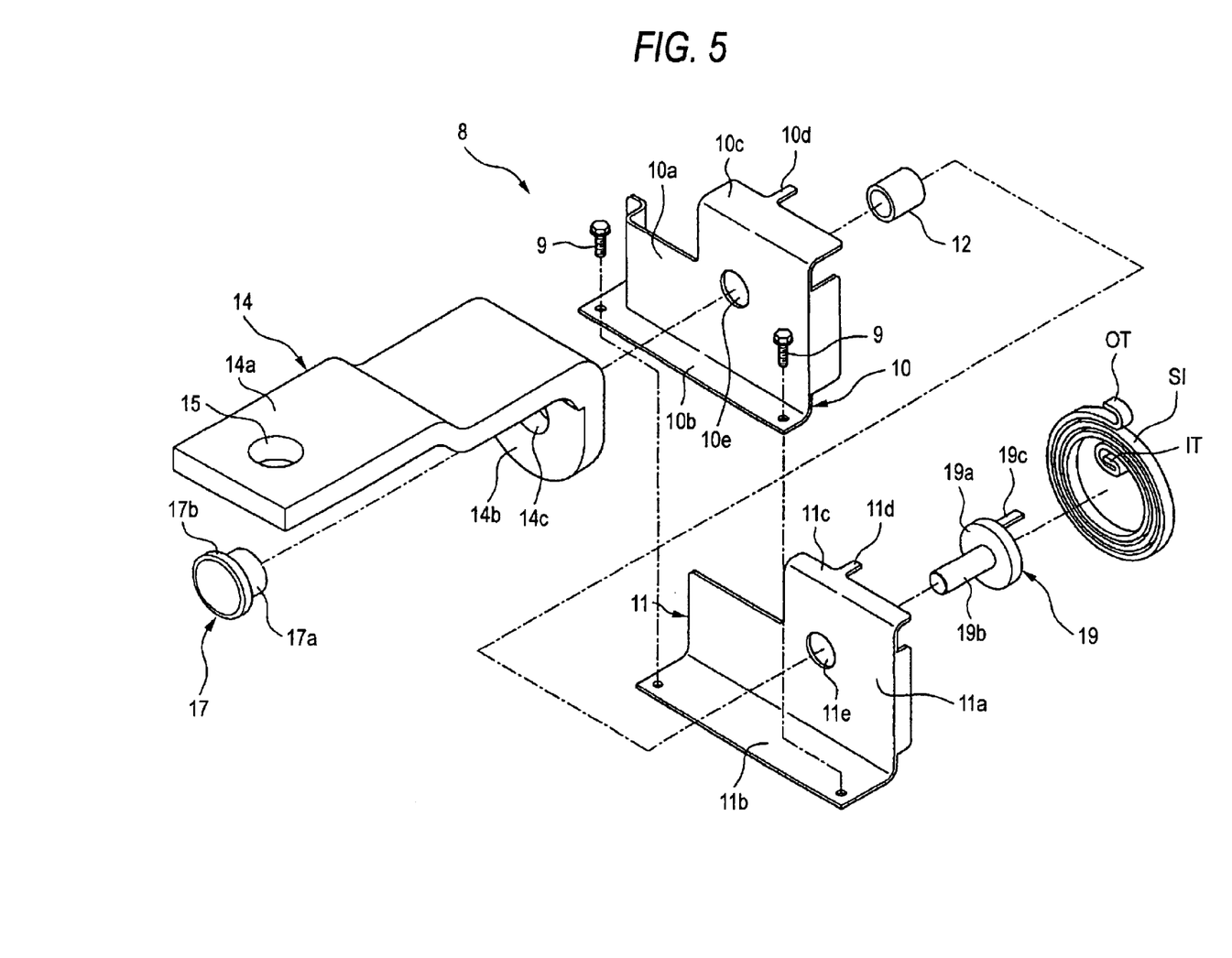
FIG. 5 is an exploded perspective view of a main part of a right-hand side floor support bracket.

Next, the floor support brackets 8, 8' will be described based on FIGS. 4, 5. Note that since the floor support brackets 8, 8' are symmetrically shaped members, only the floor bracket 8 illustrated as being provided at the right-hand side of the seat cushion 4a in FIG. 3 will be described, and therefore the description of the floor support bracket 8' which is provided on the left-hand side will be omitted.

The floor support bracket 8 includes an inner bracket 10 and an outer bracket 11 which are fixed to the floor panel F with bolts 9. The inner bracket 10 is a member of a crank-shaped cross section which has a mounting flange portion 10b provided along a lower edge of a vertical wall portion 10a in such a manner as to extend toward the outside of a passenger compartment and an upper flange portion 10c formed along an upper edge of the vertical wall portion 10a in such a manner as to extend toward the inside of the passenger compartment. A stationary side locking piece 10d is formed on the upper flange portion 10c in such a manner as to extend toward the outside of the passenger compartment, so that a rearward biasing spring S1 which is one of resilient members which will be described later on is locked on the locking piece 10d. A pass-through hole 10e is formed in the vertical wall portion 10a of the inner bracket 10 for a collar 12 which is interposed between the inner bracket 10 and the outer bracket 11. Here, a stepped portion 10f (illustrated only in FIG. 4) is formed on the vertical wall portion 10a of the inner bracket 10 in such a manner as to extend toward the outside of the passenger compartment, and an interior lining 13 is disposed in this portion from above. Note that a forward biasing spring S2 as the other resilient member is provided on the floor support bracket 8'.

The outer bracket 11 is a similar member to the inner bracket 10 which has a similar crank-shaped cross section and is provided with a mounting flange portion 11b extending toward the inside of the passenger compartment along a lower edge of a vertical wall portion 11a. This mounting flange portion 11b is set to extend longer than the mounting portion 10b of the inner bracket 10 so that the mounting flange portion 10b of the inner bracket 10 is superimposed on the mounting flange portion 11b for fixation to the floor panel F.

In addition, an upper flange portion 11c is also formed along an upper edge of the vertical wall portion 11a of the outer bracket 11. This upper flange portion 11c is set to extend shorter than the upper flange portion 10c of the inner bracket 10 so that the upper flange portion 10c is superimposed on the upper flange portion 11c. A stationary side locking piece 11d extending toward the outside of the passenger compartment is also formed on the upper flange portion 11c of the outer bracket 11 for the backward biasing spring S1, which will be described later on, and this stationary side locking piece 11d is adapted for receiving thereon the stationary side locking piece 10d of the inner bracket 10 in an superimposed fashion. Here, a pass-through hole 11e for the collar 12 is also formed in the vertical wall portion 11a of the outer bracket 11, and as shown in FIG. 4, the inner bracket 10 and the outer bracket 11 are designed to be fixed to the floor panel F in a state in which they are isolated from each other by a predetermined distance by the collar 12 installed through the pass-through holes 10e, 11e to thereby form a closed cross section which is advantageous in terms of strength.

A metallic arm 14 adapted for being fixed to the rear portion on the back side of the seat cushion 4a is provided on a side of the inner bracket 10 which faces the inside of the passenger compartment. This arm 14 includes an arm main body 14a extending toward the second rear seat 4 and having a mounting hole 15 and a proximal mount portion 14b situated at a proximal end of the arm main body 14 or at an end thereof which faces the outside of the passenger compartment and bent to extend downwardly. A pass-through hole 14c is formed in the proximal mount portion 14b of the arm 14, and collar members 16, 16 each having a flange are installed in this pass-through hole 14c from sides facing the inside and outside of the passenger compartment, respectively.

A nut portion 17a of a retainer 17 is inserted into the interiors of the respective collar members 16 from the side facing toward the inside of the passenger compartment, and a tightening head portion 17b is formed on the nut portion 17a of the retainer 17 at an end situated on the side facing toward the inside of the passenger compartment. An internally threaded portion 17c is formed in the inside of the nut portion 17a of the retainer 17 from the side facing toward the outside of the passenger compartment. Note that as shown in FIG. 4, the arm 14 is covered with covers 18a, 18b made of resin which are constituted as being divided into upper and lower halves.

On the other hand, the rotating shaft member 19 is passed through the outer bracket 11, the collar 12 and the inner bracket from the side facing toward the outside of the passenger compartment. This rotating shaft member 19 has a head portion 19a and an externally threaded portion 19b, and a moving-side locking portion 19c is formed at a circumferential position of the head portion 19a, this moving-side locking portion 19c extending in an axial direction of the rotating shaft member 19 and being fixed to an inner terminal portion IT of the backward biasing spring S1 through welding or crimping.

Then, the externally threaded portion 19b of the rotating shaft member 19 is passed through the interior of the collar 12 and is fixedly screwed into the internally threaded portion 17c of the nut portion 17a of the retainer 17. Note that while the externally threaded portion 19b of the rotating shaft member 19 has been described as being fixedly screwed into the internally threaded portion 17c of the nut portion 17a of the retainer 17, the rotating shaft member 19 and the retainer 17 cay be fixed together through welding or crimping as long as both the rotating shaft member 19 and the retainer 17 are allowed to rotate together.

Figure 6:
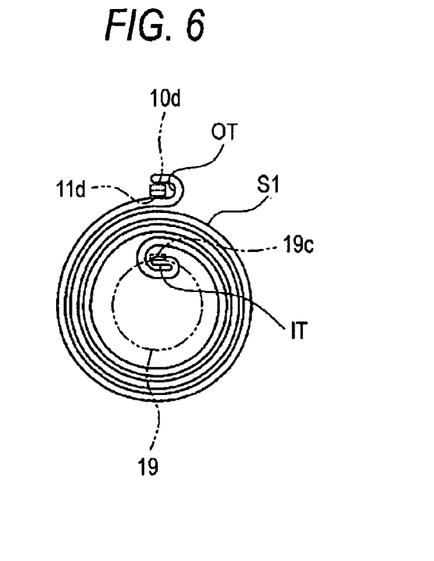
FIG. 6 is a plan view of a rearward biasing spring as viewed from a side facing the inside of a passenger compartment at a position B in FIG. 2.
Figure 7:
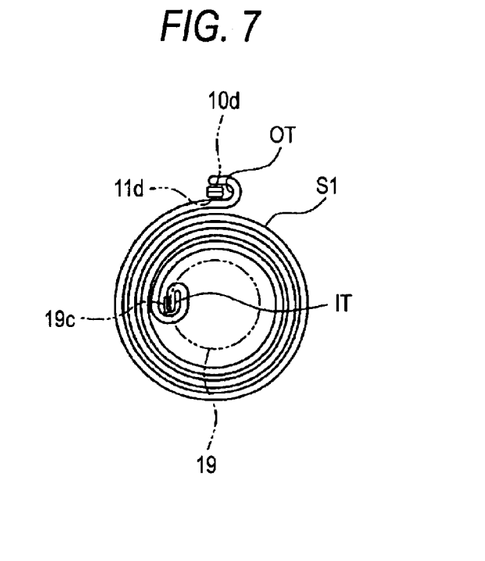
FIG. 7 is a plan view of the rearward biasing spring as viewed from the side facing the inside of the passenger compartment at a position A in FIG. 2.
Figure 8:
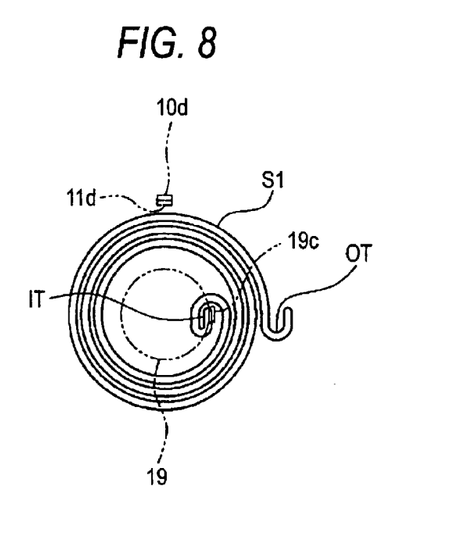
FIG. 8 is a plan view of the rearward biasing spring as viewed from the side facing the inside of the passenger compartment at a position C in FIG. 2.

As shown in FIGS. 5, and 6 to 8, the backward biasing spring S1 is a torsion spring which is formed by winding a steel material having an oval cross section in a spiral fashion so as to generate a biasing force in a rotating direction. The backward biasing spring S1 has the inner terminal portion IT inside thereof and at an outer circumferential portion thereof an outer terminal portion OT which is opened forward and is locked on the stationary-side locking pieces 10d, 11d. Note that FIGS. 6 to 8 are views as viewed from the side facing toward the inside of the passenger compartment.

The backward biasing spring S1 is formed so as to be wound in a spiral fashion in a counterclockwise direction from the outside to the inside as viewed from the side facing toward the inside of the passenger compartment and is mounted so as to be in a natural state (a state shown in FIG. 6) where there occurs no resilient deformation in a case where the folded second rear seat 4 is in the vertical state B or at a position where the seat cushion 4a is in the vertical state.

In addition, when the second rear seat 4 is in the forward horizontal state A, the inner terminal portion IT is, as shown in FIG. 7, in a state in which it is wound further through 90 degrees in a counterclockwise direction from a state shown in FIG. 6. On the other hand, when the second rear seat 4 is in the horizontal state C in the storing portion 6, the inner terminal portion IT is, as shown in FIG. 8, released from the engagement with the stationary side locking pieces 10d, 11d to impart no biasing force. Here, the resilient force of the rearward biasing spring S1 (as is true with the forward biasing spring S2, which will be described later on) is set to be smaller than the mass of the second rear seat 4. Note that the rearward biasing spring S1 is covered with a cover, not shown.

Consequently, when the second rear seat 4 which is folded up is, as shown in FIG. 2, rotated forward to be in the horizontal state A, since an inner portion of the rearward biasing spring S1 is deformed as the spring is wound as shown in FIG. 7, a rearward biasing force is applied to thereby generate an operation assisting force when the second rear seat 4 is rotated to the vertical state B. On the contrary, when the second rear seat 4 is rotated backward to the horizontal state C where the seat so rotated is stored in the storing portion 6, since the rearward biasing spring S1 rotates in a direction in which the spring is not locked on the stationary side locking pieces 10d, 11d of the inner bracket 10 and the outer bracket 11, the rearward spring S1 imparts no forward biasing force to the second rear seat 4.

Figure 9:
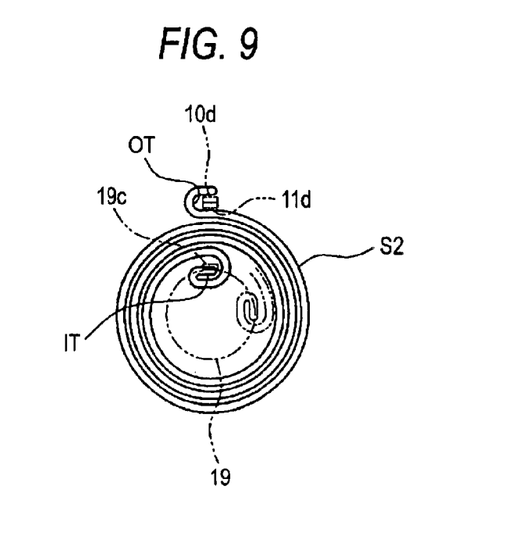
FIG. 9 is a plan view of a forward biasing spring as viewed from a side facing the outside of the passenger compartment at a position B in FIG. 2.

However, while the rearward biasing spring S1 imparts no biasing force to the second rear seat 4 which is stored in the storing portion 6 and is in the horizontal state C, the forward biasing spring S2 which is the other spring installed in the other floor support bracket 8' imparts a forward biasing force to the second rear seat 4. Note that FIG. 9 is a view showing the forward biasing spring S2 as viewed from the side facing toward the outside of the passenger compartment. In other words, the inner terminal portion IT which is situated at a position illustrated by a solid line in FIG. 9 when the second rear seat 4 is in the vertical state B is put in a state in which the internal terminal portion IT is wound through 90 degrees in a clockwise direction as viewed from the side facing the outside of the passenger compartment as shown by a chain line in FIG. 9 when the second rear seat 4 is in the horizontal state C in the storing portion. Consequently, when the second rear seat 4 is rotated to the front side the second rear seat 4 which is in the horizontal state C in the storing portion 6 can generate an operation assisting force in order to impart a biasing force in a direction in which the inner terminal portion IT is returned to the position illustrated by the solid line or a direction in which the second rear seat 4 is put in the vertical state B.

In addition, since respective members which are locked on the forward biasing spring S2 in FIG. 9 are members of the floor support bracket 8' which has a similar construction to that of the floor support bracket 8 corresponding to the rearward biasing spring S1, like reference numerals corresponding to those of the floor support bracket 8 are imparted to the members of the floor support bracket 8'.

According to the embodiment, in the event that the second rear seat 4 is folded from the state shown in FIG. 1 in which passengers can be seated thereon so as to be stored in the storing portion 6 at the rear, firstly, when the seat back 4b is folded to be superimposed on the seat cushion 4a, the second rear seat 4 is put in the horizontal state A forward of the rotating shaft members 19. Then, when the second rear seat 4 so folded up is rotated to the vertical state B shown in FIG. 2, since the rearward biasing spring S1 whose inner terminal portion IT is wound as shown in FIG. 7 when the second rear seat 4 is in the horizontal state A imparts a biasing force when the rearward biasing spring S1 is returned to the natural state (the state shown in FIG. 6), an assisting force is imparted to the second rear seat 4 which is rotated to the vertical state B.

Here, when the second rear seat 4 is moved from the horizontal state A to the vertical state B, since the rearward biasing spring S2 is constructed such that the biasing force thereof gradually decreases (as illustrated by an arrow which is left blank inside in FIG. 2), the assisting force is large enough to assist the operator in an early stage of rotating the seat upward, and the assisting force becomes smaller as the seat approaches the vertical state B, whereby there is caused no risk that the seat rotates in one breath to pass through the vertical state B, and therefore, the operation can be facilitated. As this occurs, as with the backward biasing spring S1 shown in FIG. 8, since the stationary side locking pieces 10d, 11d of the floor support bracket 8' are left unlocked with the outer terminal portion OT of the forward biasing spring S2, whereby no biasing force is imparted, there is provided no interruption to the second rear seat 4 when its posture is changed from the horizontal state A to the vertical state B.

Then, when the second rear seat 4 which is in the vertical state B is rotated further to the rear to be put in the horizontal state C in the storing portion 6 rearward of the rotating shaft members 19, the second rear seat 4 gradually receives the biasing force of the forward biasing spring S2 in the opposite direction to the direction in which the second rear seat 4 is rotated, whereby the second rear seat 4 rotates slowly from its own weight. Here, since the outer terminal portion OT of the rearward biasing spring S1 moves to a side where the engagement thereof with the stationary side locking pieces 10d, 11d is released until the second rear seat 4 which is put in the vertical state B as has been described above is then put in the horizontal state C in the storing portion 6, there is provided no interruption to the second rear seat 4 when its posture is changed from the vertical state B to the horizontal state C.

Consequently, the operator can rotate the second rear seat 4 with an operating force which is free from the biasing force of the rearward biasing spring S1 while the second rear seat 4 is rotated from the horizontal state A to the vertical state B, whereas the operator can allow the second rear seat 4 to rotate slowly from its own weight while allowing the forward biasing spring S2 to be deformed resiliently while the second rear seat 4 is rotated from the vertical state B to the horizontal state C. As a result, the load involved in the rotating operation of the second rear seat 4 can thus be reduced using no large-scale apparatus but with a simple construction in which only the rearward biasing spring S1 and the forward biasing spring S2 are provided, whereby the problem inherent in the related art can be solved at low costs with the vehicle seat storage assisting apparatus which can thus be made lighter in weight and smaller in size.

In addition, when the second rear seat 4 which is stored in the storing portion 6 in the horizontal state C is rotated to the vertical state B, since this time the forward biasing spring S2 provided within the floor support bracket 8' imparts a biasing force which gradually decreases (as illustrated by an arrow which is left blank inside in FIG. 2) in a forward biasing direction, the operator can rotate the second rear seat 4 with a small operating force with an assistance of the biasing force of the forward biasing spring S2 while the second rear seat 4 is rotated from the horizontal state C to the vertical state B, whereas the operator can allow the second rear seat 4 to rotate slowly from its own weight, while allowing the rearward biasing spring S1 to be deformed resiliently, with no force being imparted by the forward biasing spring S2 while the second rear seat 4 is rotated from the vertical state B to the horizontal state A.

In this case, too, since the forward biasing spring S2 is constructed such that the biasing force thereof gradually decreases when the second rear seat 4 moves from the horizontal state C to the vertical state B, there is generated an assisting force which is large enough to assist the operator in an early stage of rotating the second rear seat 4 upward, whereas the assisting force so generated decrease as the second rear seat 4 approaches the vertical state B, whereby there is caused no risk that the second rear seat 4 rotates in one breath to pass through the vertical state B, the operation being thereby facilitated.

Next, a second embodiment of the invention will be described by reference to FIGS. 10, 11, while also referring to FIG. 2. Note that like reference numerals are imparted to those which are like to those described with reference to the first embodiment. Here, while FIG. 11 is a perspective view of FIG. 10, the directions of a moving side locking portion 191c and a stationary side locking piece 100d are made identical to each other for the sake of simplification. In addition, as in the case with the first embodiment, a right-hand side floor support bracket 80 (a rearward biasing spring S1) will be described as an example, and hence the description of another floor support bracket 80' and a forward biasing spring will be omitted.

While the rearward biasing spring S1 is disposed outside the floor support bracket 8 (8') according to the construction of the first embodiment, according to the second embodiment, a rearward biasing spring S1 (a forward biasing spring) which is a resilient member is disposed in the interior of a floor support bracket 80 (80').

This embodiment is such that a retainer (a seat rotating shaft) 171 is tightened into a collar 121 interposed between an inner bracket 101 and an outer bracket 111 to be fixed in place therein. Flanged collar members 161, 161 are installed in a pass-through hole 141c in a proximal mount portion 141b of an arm 141, and the retainer 171 is inserted into the respective collars 161, 161. The retainer 171 is such that an externally threaded portion 171b is screwed into the collar 121 from a side facing the inside of the passenger compartment to be fixed in place therein and such that a head portion 171a is passed through the collar members 161, 161 which are passed through the pass-through hole 141c in the proximal mount portion 141b of the arm 141. Then, a cap 181 is mounted in an opening 200 formed in the proximal mount portion 141b of the arm 141 on a side facing the inside of the passenger compartment in such a manner as to cover a rearward biasing force S1, which will be described later on.

The rearward biasing spring S1 is disposed in the opening 200 in the proximal mount portion 141b of the arm 141, and an inner terminal portion IT of the rearward biasing spring S1 is integrally fixed to a moving side locking portion 191c formed on the head portion 171a of the retainer 171, whereas an outter terminal portion OT of the rearward biasing spring S1 is allowed to be locked on a stationary side locking piece 100d of the proximal mount portion 141b of the arm.

Figure 10:
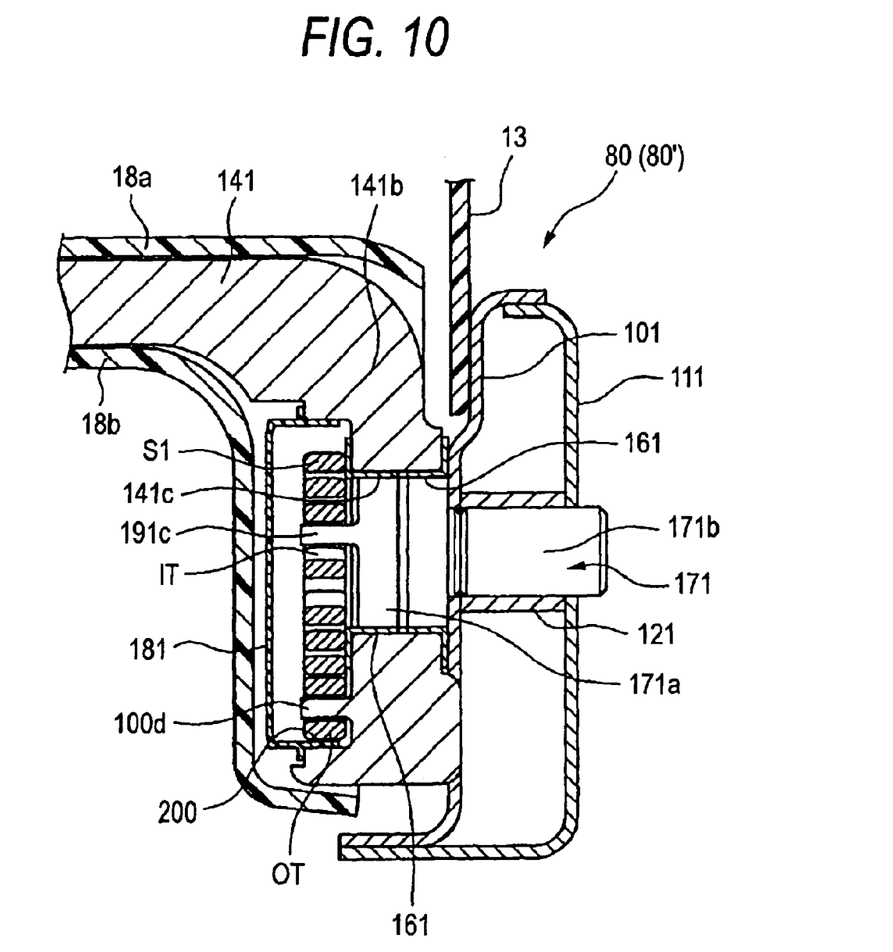
FIG. 10 is a sectional view showing a second embodiment which corresponds to FIG. 4.
Figure 11:
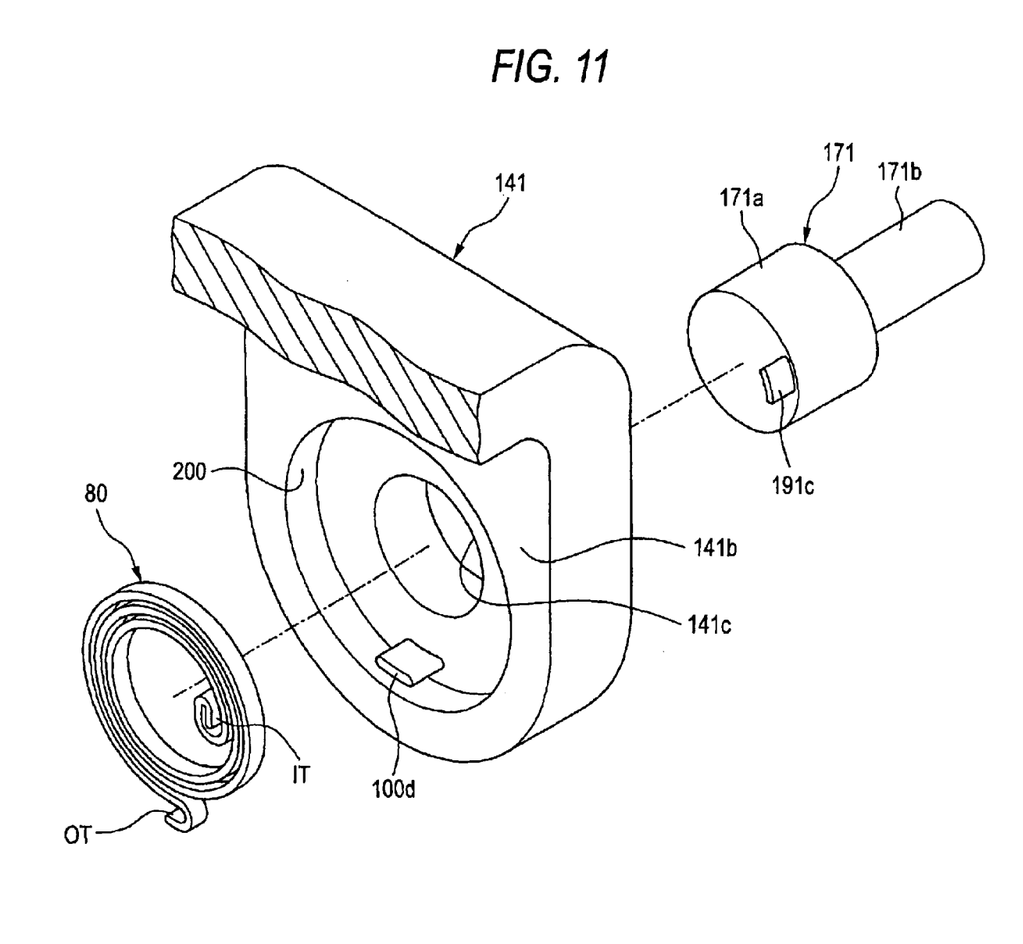
FIG. 11 is a perspective view of FIG. 10.

Consequently, in this embodiment, too, when the secpmd rear seat 4 rotates from the vertical state B to the horizontal state A and a lower side of the proximal mount portion 141b of the arm 141 rotates to a near side in FIG. 10, since the outer terminal portion OT of the rearward biasing spring S1 is pressed and the rearward spring S1 is deformed resiliently in such a manner as to be wound inwardly, an assisting force can be imparted by a resilient force so generated when the operator rotates the second rear seat 4 from the horizontal state A to the vertical state B.

In addition, similarly, an assisting force is also imparted by a forward biasing spring S1 provided in a floor support bracket 80', not shown, when the operator rotates the second rear seat 4 from the horizontal state C as occurring when stored in the storing portion 6 to the vertical state B.

As a result, in this embodiment, too, as with the first embodiment, the load involved in the rotating operation of the second rear seat 4 can thus be reduced using no large-scale apparatus but with a simple construction in which only the rearward biasing spring S1 and the forward biasing spring S2 are provided, whereby the problem inherent in the related art can be solved at low costs with the vehicle seat storage assisting apparatus which can thus be made lighter in weight and smaller in size.

Above all, in this embodiment, since the respective springs are provided within the floor support brackets 80, 80', there is provided further an advantage that the apparatus can be made smaller.

In addition, by providing the cap 181, there are provided advantages that the rearward biasing spring S1 disposed so as to face the side which confronts the inside of the passenger compartment can be made invisible from the side facing the inside of the passenger compartment to thereby improve the product quality and that the cap 181 so provided can retain the rearward biasing spring S1 in an ensured manner as a spring retaining member of the rearward biasing spring.

Note that the invention is not limited to the aforesaid embodiments, and for example, the invention can be applied to a seat in a rear row of a vehicle which is equipped with seats arranged in two front and rear rows. In addition, provided that the rearward biasing spring S1 and the forward biasing spring S2 are set such that the biasing forces thereof gradually decrease as the second rear seat 4 which is in the horizontal states A, C is rotated to the vertical state B, the invention is not limited to the spiral torsion spring which has been described in the above embodiments but can be applied to a construction in which a coil spring is used which is compressed and expanded for use. Furthermore, in addition to the torsion spring and the coil spring, if it is a resilient member, a damper can be used.

Moreover, the invention is not limited to the aforesaid embodiments. Although in the embodiments the rearward biasing spring S1 and the forward biasing spring S2 are respectively provided at both sides of the rear seat 4, both of the rearward and forward biasing springs S1 and S2 may be provided on either side of the rear seat 4.

As has been described heretofore, according to the first aspect of the invention, in a case where the seat which is folded up in the horizontal state forward of the seat rotating shafts is rotated up to the vertical state, one of the resilient members imparts a biasing force in the rotating direction so as to assist in so rotating the seat, and in a case where the seat in the vertical state is rotated further down to the horizontal state rearward of the seat rotating shafts, the seat rotates slowly from its own weight by virtue of the biasing force of the other resilient member acting in an opposite direction to the rotating direction, whereby there is provided an advantage that the problem inherent in the related art can be solved at low costs with the vehicle seat storage assisting apparatus which can thus be made lighter in weight and smaller in size.

According to the second aspect of the invention, in a case where the seat is rotated to the front side or to the rear side from the vertical state to be put in the horizontal state, since the seat can rotate from its own weight while being imparted the biasing force by the resilient member, there is provided an advantage that the seat can softly move from the vertical state to the horizontal state.

According to the third aspect of the invention, in a case where the seat which has been rotated from the horizontal state to the vertical state is rotated further down to the other horizontal state, since no biasing force is imparted from the resilient member which has imparted the biasing force to the seat when it moved to the vertical state, the resilient member having a different biasing direction is allowed to be used, whereby there is provided an advantage that in both cases where the seat which is in the forward horizontal state is rotated to the vertical state and where the seat which is in the rearward horizontal state is rotated to the vertical state, the load involved in the operations can be reduced.

What is claimed is:

1. A vehicle seat storage assisting apparatus for a foldable seat including a seat cushion and a seat back folded on the seat cushion side, the apparatus comprising:

first and second seat rotating shafts provided at both sides of the seat cushion in such a manner that the seat can be rotated to a front side and a rear side of a vehicle body about the first and second seat rotating shafts;

first floor support bracket mounted relative to a vehicle body;

a first resilient member disposed between the first seat rotating shaft and the first floor support bracket for providing a biasing force that gradually decreases as the seat rotates towards one of the front and rear sides of the vehicle body;

a second floor support bracket mounted relative to the vehicle body; and a second resilient member disposed between the second seat rotating shaft and the second floor support bracket for providing a biasing force that gradually decreases as the seat rotates towards the other of the front and rear sides of the vehicle body.

2. The vehicle seat storage assisting apparatus according to claim 1, wherein the first resilient member provides the biasing force that gradually decreases as the seat rotates towards the rear side of the vehicle body until the seat becomes approximately vertical; and wherein the second resilient member provides the biasing force that gradually decreases as the seat rotates toward the front side of the vehicle body until the seat becomes approximately vertical.

3. The vehicle seat storage assisting apparatus according to claim 1, wherein the biasing force of the first resilient member is set to be smaller than the weight of the seat, and the biasing force of the second resilient member is set to be smaller than the weight of the seat.

4. The vehicle seat storage assisting apparatus according to claim 2, wherein the biasing force of the first resilient member is set to be smaller than the weight of the seat, and the biasing force of the second resilient member is set to be smaller than the weight of the seat.

5. The vehicle seat storage assisting apparatus as set forth in claim 3, wherein each of the first and second resilient members is set such that the biasing force thereof gradually decreases as the seat which is being in a horizontal state rotates from the horizontal state to a vertical state and also such that no biasing force is imparted in a range where the seat rotates from the vertical state to a horizontal state which is situated 180 degrees opposite to each other, respectively.

6. The vehicle seat storage assisting apparatus as set forth in claim 4, wherein each of the first and second resilient members is set such that the biasing force thereof gradually decreases as the seat which is being in a horizontal state rotates from the horizontal state to the vertical state and also such that no biasing force is imparted in a range where the seat rotates from the vertical state to the horizontal states which are situated 180 degrees opposite to each other, respectively.

7. The vehicle seat storage assisting apparatus as set forth in claim 5, wherein each of the first and second resilient members is a spiral spring.

8. The vehicle seat storage assisting apparatus as set forth in claim 6, wherein each of the first and second resilient members is a spiral spring.

9. The vehicle seat storage assisting apparatus as set forth in claim 1, wherein the first and second resilient members are respectively provided at both sides of the foldable seat.

10. A vehicle seat storage assisting apparatus for a foldable seat including a seat cushion and a seat back operable to be folded on the seat cushion side, the apparatus comprising:

first and second seat rotating shafts provided at both sides of the seat cushion in such a manner that the seat cushion and the seat back so folded up together can be rotated to a front side and a rear side of a vehicle about the first and second seat rotating shafts;

first and second floor support brackets mounted relative to a vehicle body;

a first resilient member disposed between the first seat rotating shaft and the first floor support bracket for providing a biasing force that gradually decreases as the seat which is being in a horizontal state forward of the seat rotating shafts rotates from the horizontal state to a vertical state; and a second resilient member disposed between the second seat rotating shaft and the second floor support bracket for providing a biasing force that gradually decreases as the seat which is being in a horizontal state rearward of the seat rotating shafts rotates from the horizontal state to the vertical state.

11. The vehicle seat storage assisting apparatus according to claim 10, wherein the biasing force of the first resilient member is set to be smaller than the weight of the seat, and the biasing force of the second resilient member is set to be smaller than the weight of the seat.

12. The vehicle seat storage assisting apparatus as set forth in claim 10, wherein each of the first and second resilient members is set such that the biasing force thereof gradually decreases as the seat which is being in a horizontal state rotates from the horizontal state to the vertical state and also such that no biasing force is imparted in a range where the seat rotates from the vertical state to a horizontal state which is situated 180 degree opposite to the horizontal state.

13. The vehicle seat storage assisting apparatus as set forth in claim 11, wherein each of the first and second resilient members is set such that the biasing force thereof gradually decreases as the seat which is being in a horizontal state rotates from the horizontal state to the vertical state and also such that no biasing force is imparted in a range where the seat rotates from the vertical state to a horizontal state which is situated 180 degree opposite to the horizontal state.

* * * * *